United States Patent [19]

Hall, III

[11] Patent Number: 5,445,234

[45] Date of Patent: Aug. 29, 1995

[54] DUAL DRIVE TRANSMISSION

[75] Inventor: Arthur Hall, III, Cicero, Ind.

[73] Assignee: General Motors Corporation, Detroit, Mich.

[21] Appl. No.: 197,036

[22] Filed: Feb. 16, 1994

[51] Int. Cl.[6] .............................................. B62D 11/04
[52] U.S. Cl. ................... 180/6.28; 180/6.44; 180/6.5; 180/170; 180/178; 475/150; 475/153
[58] Field of Search ............... 475/5, 150, 151, 153; 477/3; 180/6.28, 6.44, 6.5, 178

[56] References Cited

U.S. PATENT DOCUMENTS

| | | | |
|---|---|---|---|
| 4,541,051 | 9/1985 | Jarret et al. | 180/6.28 |
| 4,998,591 | 3/1991 | Zaunberger | 180/6.44 |
| 5,168,946 | 12/1992 | Dorgan | 180/6.44 |
| 5,363,937 | 11/1994 | James | 180/6.28 |

*Primary Examiner*—Mitchell J. Hill
*Attorney, Agent, or Firm*—Donald F. Scherer

[57] ABSTRACT

A dual-drive electric transmission operated by a generator that may be powered, for example, by an internal combustion engine. Left and right motor networks have a rotation rotor, the motor networks being powered by the generator. A speed control assembly independently effects rotation of the rotor in each motor network at selected speeds. Left and right combining differentials are associated with the respective left and right motor networks. Each combining differential has a sun gear, a ring gear and a plurality of planetary gears meshing with the sun and ring gears. An output carrier supports the planetary gears. The sun gear in each left and right combining differential is driven by the respective left and right motor network. The ring gears are conjoined for unitary rotation in order to provide a mechanical regenerative path between the combining differentials. A transfer differential interacts between the sun gears in the left and right combining differentials to serve as a mechanical regenerative path until the rotor in one of the motor networks reverse rotates under the load applied to the output carrier associated therewith, and a power transfer means thereafter effects electrical regeneration between said reversely rotating rotor and the rotor in the other motor network.

16 Claims, 2 Drawing Sheets

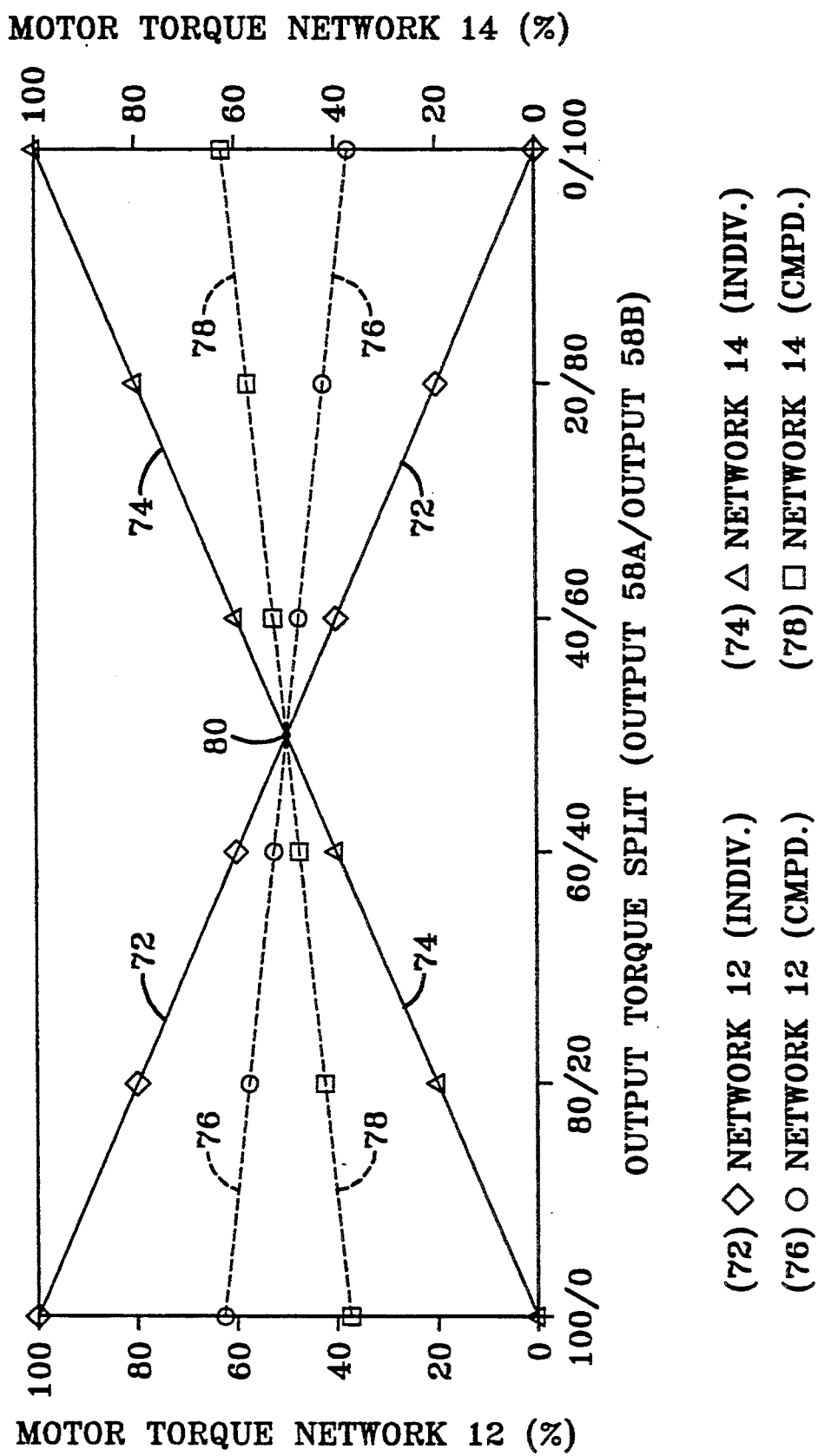

DUAL DRIVE TRANSMISSION

TECHNICAL FIELD

The present invention relates generally to transmissions for vehicles. More particularly, the present invention relates to a dual-drive transmission particularly suited for military track vehicles. Specifically, the present invention relates to a dual-drive transmission that has two drive sources which are independently controlled to provide two outputs that are interconnected to form a single mechanical path as well as an electrical regeneration path that allows power to be transferred from one output to the other.

BACKGROUND OF THE INVENTION

Proposals for driving military track vehicles by an electrical transmission commonly suggest the use of a single generator that powers two electric motors—one motor being operatively connected to the track on one side of the vehicle and the other motor being operatively connected to the track on the other side of the vehicle. The two motors are independently controlled, such that the vehicle moves in a straight manner when the speeds of the motors are equal, and the vehicle is steered when the speeds of the two motors are independently varied. During a turn in either direction, one track becomes the inner track (relative to the turn), and the other track becomes the outer track. A major drawback of this arrangement is the requirement that the vehicle be capable of delivering full torque to either of its two tracks. This requires that each motor be capable of operating under full output of the generator. However, during most maneuvers of the vehicle, half the generator output is delivered to each track so that each motor is operated at only half its rated capacity.

A second drawback to the previously proposed electrical transmission system is even more apparent when one considers how the vehicle is steered. More particularly, a track vehicle is steered by slowing one track and increasing the speed of the other track. As the inner track is slowed, it absorbs a sufficient mount of power, usually far in excess of the power required for propulsion—i.e., the power required to keep the vehicle moving along its intended path. When the speed of the inner track is decreased, it is required that the power that would otherwise be absorbed be transferred to the outer track so as to avoid the inefficiency of dissipating this power in the form of heat. If the power were lost, the vehicle would slow down significantly each time a turn is made. In a pure electrical system (devoid of mechanical devices), the transfer or feedback of this otherwise lost power from one motor to another is usually accomplished by the means of an electrical feedback system. Such a feedback is commonly termed "regeneration" and unless the electric motors are further oversized (over and above the capacity of the generator), the motor capacity limits the amount of power that can be regenerated from one track to the other. Moreover, even further losses are suffered because the electrical feedback paths are inherently less efficient than the mechanical paths presently used in hydrokinetic transmissions.

SUMMARY OF THE INVENTION

It is, therefore, a primary object of the present invention to provide a new, novel and improved transmission system that will accommodate two drive sources and provide two outputs—the speeds of the two outputs being independently controlled, yet the transmission provides not only a mechanical path but also an electrical path to transfer power from one output to the other.

It is another object of the present invention to provide a new, novel and improved transmission system, as above, wherein either drive source can deliver torque to either output such that when full torque is required at one output, both drive sources will contribute to that output, thereby permitting a reduction in the maximum output capacity of each drive source but still maintaining the capacity of the system to meet extreme performance goals.

It is a further object of the present invention to provide a new, novel and improved transmission system, as above, wherein the power source capability is accomplished by adding a planetary combining differential at each output and a transfer differential between the two outputs—the transfer differential permitting power to flow from one output to the other, and the combining differential providing a means to combine the torques of the two drive sources and deliver the combined torque to the outputs.

It is still another object of the present invention to provide a new, novel and improved transmission system, as above, wherein regenerative steering power is mechanically transferred from the slower output to the faster output.

It is yet a further object of the present invention to provide a new, novel and improved speed control arrangement for a transmission system, as above, wherein the transmission imposes a specific driver-selected speed on each output, with varying ground and vehicle speed conditions imposing a specific, reactive torque on each output, the transmission responding to the independent torques imposed on each output as required to maintain the selected output speeds.

It is a still further object of the present invention to provide a new, novel and improved electrical transmission system, as above, wherein the drive sources are in the nature of electric motors having reduced capacity yet still being capable of supplying the needs of the regeneration process involved in the operating and steering of a track vehicle.

It is an even further object of the present invention to provide a new, novel and improved electrical transmission system, as above, wherein each motor need only deliver about 60% of the full torque required for either of the inner and outer tracks; it being understood that all power is delivered by the motors, but full torque can be achieved with a 60/40 split between the two motors.

It is also an object of the present invention to provide an electrical transmission system, as above, wherein only about 25% of the regenerated power is provided by an electrical feedback path.

These and other objects of the invention, as well as the advantages thereof over existing and prior art forms, which will be apparent in view of the following detailed specification, are accomplished by means hereinafter described and claimed.

In general, a dual-drive transmission embodying the concepts of the present invention utilizes two drive sources and provides two outputs that are interconnected to the drive tracks on both sides of an electrical vehicle, such as a military track vehicle. The speeds of the output are controlled independently and yet the dual-drive transmission provides a mechanical path to transfer power from either motor to the opposite side and from one output to the other. This transfer not only reduces the motor capacity required to provide for speed control as the vehicle moves along a linear path, but also reduces the motor capacity required during the steering operation of the vehicle, in particular, during the regenerated power process.

To appreciate the invention in its operative environment, the dual-drive transmission employs differential devices that allow power to flow from one output to the other. The differential devices provide the means for combining the torques developed by both motors for delivering the combined torque to the tracks on either side of the vehicle, as the output conditions dictate. The differentials also provide a mechanical path to transfer a majority of the regenerated power, while steering, from the slower moving, inner track to the faster moving, outer track on whichever side of the vehicle they may be located.

The dual-drive transmission comprises first and second motor networks, first and second planetary combining differential gear assemblies, a transfer differential gear assembly, and a power transfer network. The first and second motor networks each have a motor with a rotor that delivers an adjustable speed in response to a speed control signal, and at whatever torque is required to maintain that speed up to the maximum capability of the motor. As such, the selected motor speed is maintained even while the output torque varies in response to the load imposed on each track by the terrain and the vehicle conditions.

Each of the first and second motor networks has means for developing a sensing signal indicative of the delivered speed. The first and second planetary combining differential gear assemblies, respectively, cooperate with the first and second motor networks. Each of the first and second planetary combining differential gear assemblies has respective sun, planetary and ring gears, as well as a carrier at each of its respective output stages. Each of the sun gears has a first end connected to its respective rotor and a second end connected to the planetary gears in that planetary gear assembly. The planetary gears are, in turn, operatively connected to their respective ring gear and carried on the output carrier. The ring gears of the planetary combining differentials are connected to each other.

The transfer differential gear assembly has fast and second gears meshingly engaged with multiple pinions supported from an output carrier. The first and second gears are respectively connected to the second end of the sun gears of the first and second planetary combining differential gear assemblies, whereas the output carrier of the transfer differential gear assembly is connected to the ring gears of the combining differentials.

The overall effect is best appreciated by remembering that the electric motors control speed and produce the torque required to drive the vehicle at the selected speed, up to the output capacity of the motor. As such, the transfer network does not function unless the torque imposed on one of the motors exceeds the input to that motor from the generator. In that situation, the feedback system transfers the excess torque, as required. This situation occurs only under severe steering regeneration, as will be hereinafter more fully described.

To acquaint persons skilled in the arts most closely related to the present invention, one preferred embodiment of an electric transmission that illustrates a best mode now contemplated for putting the invention into practice is described herein by, and with reference to, the annexed drawings that form a part of the specification. The exemplary transmission is described in detail without attempting to show all of the various forms and modification in which the invention might be embodied. As such, the embodiment shown and described herein is illustrative and, as will become apparent to those skilled in these arts, can be modified in numerous ways within the spirit and scope of the invention; the invention being measured by the appended claims and not by the details of the specification.

BRIEF DESCRIPTION OF THE DRAWINGS

FIG. 2 is a graphic representation that illustrates the sharing of the output torque of the transmission between the motors in the arrangement depicted in FIG. 1.

DESCRIPTION OF AN EXEMPLARY EMBODIMENT

Figure 1:
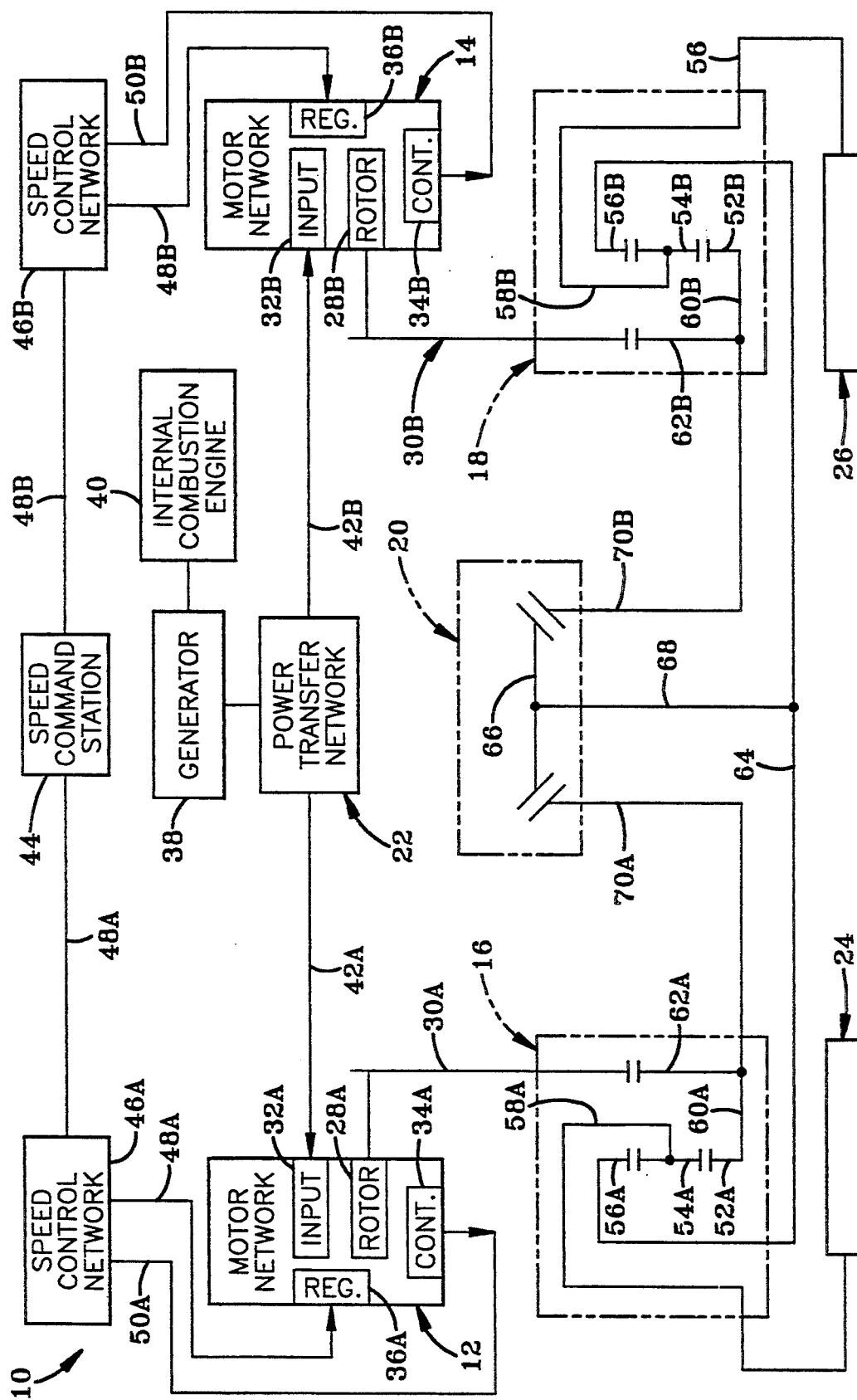
FIG. 1 is a block diagram of the dual-drive transmission of the present invention.

One representative form of a dual transmission embodying the concepts of the present invention is designated generally by the numeral 10 on the accompanying drawings. The representative dual transmission 10 comprises left and right motor networks 12 and 14, respectively, left and right planetary combining differential gear assemblies 16 and 18, respectively, a transfer differential gear assembly 20, and a power transfer network 22. For the embodiment shown in FIG. 1, the left and right motor networks 12 and 14 are operatively interconnected to two drive tracks 24 and 26 of the type that are, particularly in military vehicles (not shown), designated as the left and right tracks. The speed of the left and right drive tracks 24 and 26 can be controlled independently of each other, and yet the dual-drive transmission 10 provides a mechanical path to transfer power (the product of torque multiplied by speed) from one track to the other.

The left and right motor networks 12 and 14 are essentially the same and each includes a rotor 28 which serves as the output of each motor network. The rotor 28 (designated as the ROTOR on FIG. 1) is connected to an output member, such as the drive gear 30 depicted. The motor networks also preferably include an input circuit stage 32 (designated as the INPUT on FIG. 1), a control circuit stage 34 (designated as CONT. on FIG. 1) and a regulating circuit stage 36 (designated as REG. on FIG. 1). The functional operation of the rotors 28A and 28B, the circuits comprising the input stages 32, the circuits comprising the regulating stages 36 and the generator 38 are well-known in the art and are not, therefore, described in detail but are, instead, discussed generally and then only as they relate to the operation of the present invention.

As previewed in the preceding paragraph, and as will appear in the detailed description which follows, a particular structural member, component or arrangement may be employed at more than one location. When referring generally to that type of structural member, component or arrangement a common numerical designation shall be employed. However, when one of the structural members, components or arrangements so identified is to be individually identified, it shall be referenced by virtue of a letter suffix employed in combination with the numerical designation employed for general identification of that structural member, component or arrangement. Thus, there are at least two rotors which are generally identified by the numeral 28, but the specific, individual left and right rotors are, therefore, identified as 28A and 28B in the specification and on the drawings. This suffix convention shall be employed throughout the specification.

The input stage 32A of motor network 12, as well as the input stage 32B of motor network 14, receives excitation from a generator 38 that may, for example, be driven by an internal combustion engine 40. As depicted, the generator 38 may supply electrical energy through the power transfer network 22 to the inputs 32A and 32B by the electrical conductors 42A and 42B, respectively.

The control circuit stages 34A and 34B of networks 12 and 14, respectively, develop an adjustable speed command that is delivered to the respective rotors 28A or 28B in response to speed control signals provided from the speed command station 44 and transmitted through the speed control networks 46A and 46B and to the regulating circuits 36A and 36B by signal connectors 48A and 48B. The regulating circuit stages 36A and 36B of the left and right motor networks 12 and 14, respectively, develop sensing signals that are indicative of the speed and torque (which are combined as power) being developed by each respective rotor 28A and 28B of the left and right motor networks 12 and 14. The sensing signals are muted back to the respective speed control networks 46A and 46B by signal conductors 50A and 50B.

As such, and as will become more fully apparent, the power transfer network 22 serves to provide electrical current from the generator 38 to the motor networks 12 and 14 as well as between the motor networks 12 and 14. That is, the generator power would be delivered to the network 22 and would be distributed to the motor networks 12 and 14 as required to maintain the speed selected for each motor network 12 and 14. The amount of current to each motor network 12 and 14 would, therefore, be a function of the reactive torque loading imposed on the individual transmission outputs or tracks 24 and 26 as they move the vehicle. The power transfer network 22 must also have the capability of transferring regenerative power electrically between the motor networks 12 and 14, as required. Thus, the speed requested of each motor network, and the torque required to drive each motor network at the selected speed, would determine the power flow from the generator 38 and between the motor networks 12 and 14.

Before continuing with an explanation as to the operation of the transmission 10, the structural arrangement of the combining differential gear assemblies 16 and 18, as well as the transfer differential gear assembly 20 and their mechanical interconnection, should be explained.

Specifically, the left and right planetary combining differential gear assemblies 16 and 18, respectively, cooperate with the left and right motor networks 12 and 14. The planetary combining differential gear assemblies each have a sun gear 52, a plurality of planetary gears 54 and a ring gear 56. The first planetary combining differential assembly 16 has a carrier 58A that acts as its output stage and is operatively connected to the left track 24. Similarly, the second planetary combining differential gear assembly 18 has an output carrier 58B that is operatively connected to the right track 26.

The sun gear 52A is supported on an annular shaft 60A that is connected by a chain drive or any other suitable torque transfer device, such as the meshing transfer gear 62A, as shown, to the drive gear 30A secured to the rotor 28A of the left motor network 12. Similarly, the sun gear 52B is supported on an annular shaft 60B that is connected, as by meshing transfer gear 62B, to the drive gear 30B secured to the rotor 28B of the right motor network 14. Each of the sun gears 52A and 52B also meshingly engage its associated planetary gear set 54A and 54B, respectively. Each of the planetary gear sets 54A and 54B, which are supported from their individual differential output carders 58A and 58B, also mesh with their associated ring gear 56A and 56B. The respective ring gears 56A and 56B for the planetary gear sets 16 and 18 are also connected to each other, as represented at 64.

The transfer differential gear assembly 20 has a pinion gear 66 supported from a carrier 68 that is, in turn, fixedly secured to the interconnection 64 between the planetary gear sets 16 and 18. The pinion gear 66 is not only connected to an input gear 70A presented from the annular shaft 60A that is rotatably connected to the sun gear 52A, but the pinion gear 66 is also connected to an input gear 70B presented from the annular shaft 60B that is rotatably connected to the sun gear 52B.

In general, the left and right motor networks 12 and 14 and the planetary combined differential gear assemblies 16 and 18 are segmented into two operating paths: one path for controlling the speed and torque of the left track 24; and the other path for controlling the speed and torque of right track 26. The two operating paths are brought together by the transfer differential gear assembly 20 which allows the power developed by either of the two operating paths to flow between each other. The combining differential assemblies 16 and 18 combine the torque from the motor driving one track with the excess torque from the other track as delivered by the transfer differential assembly 20 and shaft 64. The torque balance is determined solely by the torque required at each track 24 and 26.

Inasmuch as a system embodying the concepts of the present invention is a speed control system, the desired speeds for each motor network 12 and 14 are requested and attained with the actual torque encountered. Thus, the power required, and the torque developed, is the result of the loading resistance encountered by the tracks 24 and 26 at the requested speed.

A steer command would, therefore, cause one motor network 12 or 14 to increase in speed while the other motor network 14 or 12 would decrease in speed a similar amount. The torque and power flows delivered are those required to drive the tracks 24 and 26 at the selected speed in view of the reaction loading applied to the tracks from the terrain when the tracks are moving at the selected, individual speeds. As the motor networks 12 and 14 change speeds, the generator 38 delivers a greater percentage of its power to the high speed motor networks 12 or 14 and a lesser percentage of its power to the lower speed motor networks 14 or 12.

Regeneration is the name given to the transfer of power from the slower track (the inner track as the vehicle is steered through a turn) to the faster track (the outer track as the vehicle is so steered).

The inner track is, in part, driven by vehicle inertia as it slows, and the power required at the outer track (which requires additional power to increase its speed under load) is regenerated through the mechanical path from one ring gear 56A to the other ring gear 56B.

Once full generator power is delivered to the high speed track and none is being delivered to the low speed track, the unpowered motor network begins to operate as a generator in response to the load applied by the terrain against that track. At this point, the generator-operating output of the low speed motor combines with the output of the generator 38 to power the high speed motor. Operation of the transmission 10 in this phase is designated as "Electrical Regeneration."

The power transfer network 22 and the motor networks 12 and 14 cooperate to provide the electrical regeneration feedback path necessary for the aforesaid steering operation of the vehicle.

In operation, the vehicle moves in a straight line manner when the speed of each of the left and right motor networks 12 and 14 is the same. However, the vehicle is steered by increasing the speed of one track 24 or 26 by a specific amount for the desired rate of turn and decreasing the speed of the other track 26 or 24 by the same amount. Assuming, for example, that the vehicle is to be turned to the left, the speed applied to the right or outer track 26 would be increased by a selected amount and the speed of the left or inner track 24 would be decreased by the same amount.

The speed applied to whichever becomes the inner and outer tracks depends on the speeds of the motors as they respond to the steer request of the driver. The torques depend on the steer request, the vehicle speed, the vehicle geometry and the ground or terrain conditions. The present transmission system generates whatever torque is required to maintain the speeds requested of the two tracks.

It should also be recognized that the ratio of the number of teeth on the ring gears 56 to the number of teeth on the sun gears 52 serves to proportion the regenerative power flow between the mechanical and the electrical paths. Purely as an operative example, the ring gears will be assumed to have three times the number of teeth as the sun gears. It must be understood, however, that the present concepts is in no way limited to that particular ratio as will hereinafter be more fully developed.

The pinion gear 66 of the transfer differential 20 meshingly engages the transfer gears 70A and 70B supported from the respective shafts 60A and 60B. To facilitate an understanding of the present invention, it will be assumed that the transfer gears 70A and 70B have the same number of teeth. Under that condition, the connected ring gears 56A and 56B, during a steering maneuver, will have a speed that is equal to the average speed of the two motor driven sun gears 52A and 52B. That is, the ring gears 56 rotate at a speed that is proportional to the mean vehicle speed, while the sun gears 52 increase and decrease the speeds of the carriers 54 in equal amounts. The speed of the tracks 24 and 26 thus have an absolute relationship that is determined by the speed control networks 46A and 46B in conjunction with the teeth on the gear components of the combining differentials 16 and 18 and the transfer differential 20. The torque on the tracks 24 and 26 do not follow the mathematical relationship which determines the speed, but rather reflects the dynamic conditions encountered by the tracks 24 and 26.

The dual-drive transmission 10 is a so called "speed control" device, as are modern hydrokinetic, hydrostatic and electric transmissions. For such devices, the dual-drive transmission 10 imposes a specific speed on each track 24 and 26. Additionally, varying ground and vehicle conditions impose a specific torque on each track 24 and 26. During operation, the dual-drive transmission 10 reacts, as required, to the imposed torque on the tracks 24 and 26 to maintain the requested output speeds which are determined by speed control networks 46A and 46B.. The speed and torque applied to the tracks 24 and 26 are determined, in part, by the gears within the dual-drive transmission 10.

The gear ratio between the respective motors of the networks 12 and 14 and their respective driven sun gears 52A and 52B will, for simplicity, also be assumed to be one-to-one (1:1). In actuality, this ratio is determined by the optimum motor speed and the required transmission output speed. In the present invention, inasmuch as the carrier 68 of the transfer differential assembly 20 always rotates at the average of the two same-size motors of networks 12 and 14, it follows that the ring gears 56A and 56B of the combining differential gear assemblies 16 and 18 rotate at the average speed of the two rotors 28A and 28B of networks 12 and 14. When the rotors rotate at the same speed, the sun gears (52A and 52B) and the ring gears (56A and 56B) also rotate at equal speeds, causing the output speeds of the left and right tracks 24 and 26 to be equal. Such is the case when a vehicle is travelling in a straight line. However, in a case when a steering request, as hereinafter described, is imposed, one rotor is driven at a proportionately different speed from the other and the output speeds are concomitantly different. The speed and torque of the associated components of the dual-drive transmission 10 may be expressed mathematically. In doing so the following terminology is conveniently employed.

Description of Terns $N_{ml}$=ROTOR SPEED IN THE LEFT MOTOR NETWORK 12
R=NUMBER OF RING GEAR (56A AND 56B) TEETH
$N_{ol}$=SPEED OF THE OUTPUT CARRIER 58A
$N_{mr}$=ROTOR SPEED IN THE RIGHT MOTOR NETWORK 14
S=NUMBER OF TEETH IN THE SUN GEARS 52A AND 52B)
$N_{or}$=SPEED OF THE OUTPUT CARRIER 58B
$N_r$=SPEED OF THE RING GEARS 56A AND 56B AND OUTPUT CARRIER 68 OF THE TRANSFER DIFFERENTIAL GEAR ASSEMBLY 20
$T_{ml}$=TORQUE SUPPLIED BY THE LEFT MOTOR NETWORK 12
$T_{ol}$=TORQUE SUPPLIED BY THE LEFT OUTPUT CARRIER 58A
$T_{mr}$=TORQUE SUPPLIED BY THE RIGHT MOTOR NETWORK 14
$T_{or}$=TORQUE SUPPLIED BY THE RIGHT OUTPUT CARRIER 58B In order to ascertain whether a part of the steer power is regenerated electrically, one must determine if the direction of the motor torque for one track reverses. Although either side could be the low speed side or the high speed side, it will be assumed that the right side is the low speed side and the left side is the high speed side. Thus, the point at which part of the steer power begins to regenerate electrically is when the torque on the slow speed motor changes from positive to negative. The change in the direction of the torque changes the direction of the power flow. For the direction of motor torque to change, the value of the torque must pass through zero. To this end it can be developed that:

$$\frac{T_{ol}}{T_{or}} = -\left(1 + \frac{2S}{R}\right) \quad (1)$$

The foregoing equation defines the zero torque condition on the low speed side motor and therefore the point at which partial electrical regeneration begins. In the selected configuration for the present explanation, the ring gears each have three times as many teeth as the associated sun gears. Hence, the ratio $T_{ol}/T_{or}$ is equal to $-1.667$, and partial electrical regeneration begins at this point.

The speed $N_r$ as well as the speed $N_{ol}$ and the speed $N_{or}$ may be individually expressed by the following mathematical expressions (2), (3) and (4), respectively, as a function of rotor or motor speeds and the number of teeth on the combining ring (56A and 56B) and sun (52A and 52B) gears:

$$N_r = \frac{(N_{ml} + N_{mr})}{2} \quad (2)$$

$$N_{ol} = N_{ml}\left(\frac{S}{R+S}\right) + N_r\left(\frac{R}{R+S}\right) \quad (3)$$

$$N_{or} = N_{mr}\left(\frac{S}{R+S}\right) + N_r\left(\frac{R}{R+S}\right) \quad (4)$$

The torque reactions with respect to the inner and outer tracks can be similarly derived. As with the speed relationships, the torque on either inner or outer track (the left and right tracks 24 and 26 in the example stated) is a function of both motor torques and the number of teeth in the sun and ring gears of the combining differential gear assemblies 16 and 18. Because of such relationship, the present invention provides the ability to transfer torque and therefore power between the inner and outer tracks. Military specifications, for example, require that a vehicle be capable of delivering all torque to one track if the other track does not encounter a reactive torque condition—as would be the situation if one track were on ice, or not otherwise be able to react to torque encountering conditions. Hence, in the condition where all torque is delivered to one track 24 or 26 during a maneuver, the transfer of steering power begins, and the equations for the torque may be expressed by relationships (5) and (6) as follows:

$$(T_{ol} - T_{or}) = (T_{ml} - T_{mr})\left(\frac{R+S}{S}\right) \quad (5)$$

$$T_{ol} + T_{or} = T_{ml} + T_{mr} \quad (6)$$

From relationships (5) and (6), the mathematical expressions (7) and (8) may be derived for those situations where all torque is delivered to one track.

If $T_{ol}=1$, and $T_{or}=0$, then:

$$T_{ml} = T_{mr}\left(\frac{R+2S}{R}\right) \quad (7)$$

and, if $T_{or}=1$, and $T_{ol}=0$, then:

$$T_{mr} = T_{ml}\left(\frac{R+2S}{R}\right) \quad (8)$$

From the mathematical expressions (7) and (8), it may be concluded that to deliver full torque to one side of the transmission, each motor need only provide a portion of the full torque. This ability to deliver full torque to only one track also exists when the vehicle is stalled in the straight ahead condition. This specific situation is graphically expressed in FIG. 2, which does not reflect a steer condition.

To continue the hypothetical, wherein the ring gears 56A and 56B have three times the number of internal teeth as the sun gears 52A and 52B, the motors of the networks 12 and 14 would need to be sized to carry only 62.5% of the full torque. The reduced capacity of the motors of the networks 12 and 14 may be further described with reference to FIG. 2.

FIG. 2 has a first Y-axis, located on the left side of the X-axis, indicating the motor torque (shown in percentages) of network 12 and a second Y-axis, located on the right side of the X-axis, indicating the motor torque (shown in percentages) of network 14. The X-axis of FIG. 2 represents the output torque split between outputs 58A and 58B.

FIG. 2 further illustrates four plots 72, 74, 76 and 78, each identified by the nomenclature appearing beneath the X-axis, and all of which intersect at a central region 80 that represents the output torque of each of the networks 12 and 14 as being 50% of the total torque when the output torque is split 50/50 between the outputs 58A and 58B. The plots 72, 74, 76 and 78 are associated with the operation of the tracked vehicle as it moves in a relatively straight manner. The plots 72, 74, 76 and 78, respectively, illustrate the following:

1) the network 12 operating without the benefits of the present invention;
2) the network 14 operating without the benefits of the present invention;
3) the network 12 operating with the benefits of the present invention; and,
4) the network 14 operating with the benefits of the present invention.

In actuality, the plots 72 and 74 are prior art devices in that each of the networks 12 and 14 operate completely independent from each other and at some time, as discussed in the Background of the Invention, must deliver 100% of the full torque required. For example, if full torque is necessary to be applied to one of the tracks, the appropriate motor network must supply this full torque. The individual motor networks 12 and 14 do not have the benefit of the present invention whereby a mechanical path is provided to transfer the required torque from one network to the other.

On the other hand, the plots 76 and 78 represent the present invention whereby the two planetary combining differential gear assemblies 16 and 18 and the transfer differential gear assembly 20 allow for the torque provided by each of the motors to be combined and to be delivered to both the vehicle outputs—i.e.: left track 24 and right track 26.

From FIG. 2, in particular from plot 76, it can be seen that the maximum motor torque required for network 12 is approximately 62% of the total output torque.

Similarly, from plot 78, it can be seen that the maximum torque required for network 14 is also approximately 62% of the total output torque. Accordingly, the practice of the present invention reduces the torque capacity required by the motors, during the movement of the tracked vehicle in a straight line, by about 38% (100%−62.5%) so that smaller (relative to prior art devices) motors may be used in the dual-drive transmission 10 allowing for an attendant cost, weight and volume reduction.

The present invention also reduces the required motor capacity involved with the steering operation of the vehicle. During such a steering operation, the net torque on the outer track 26 is greater than the net torque on the inner track 24. The additional torque required to steer, such as by sliding the tracks laterally along the ground, is positive on the outer (faster) track and negative on the inner (slower) track. When the steering torque exceeds the torque required to maintain mean vehicle speed, the net torque on the inner track becomes negative—i.e.: is being wasted. More particularly, since the inner track speed is still positive but the torque has become negative, the power (speed and torque) at the inner track is negative. For such a situation, the inner track is absorbing power instead of transmitting it to the ground. This negative absorption of power should be terminated and this power should be transferred to the outer track to obviate both wasteful dissipation of the power and undesirable inefficiencies during the steering maneuvers of the tracked vehicle. The transfer of power from the inner track to the outer track is commonly referred to as the power being "regenerated" to the outer track.

Under all except light steer maneuvers, the torque on the inner track is negative while the torque on the outer track is positive. Without the benefits of the present invention—as particularly prevalent in prior art, independent motor drive systems—the motor reacting to the negative torque becomes a generator and electrically regenerates power to the other motor. Such regeneration is commonly accomplished by an electrical transfer system devoid of mechanical devices. The requirement to regenerate power electrically is undesirable because of the level of power which must be regenerated and the inherent inefficiencies of the electrical transfer system as compared to any mechanical power transfer system. Under the operation of such prior art devices, the torque that the motor should transfer during a steer with maximum regeneration is usually greater than the torque required for the maximum stall condition of the vehicle in the range (non-steering) condition. However, unlike the stall situation in the range condition, the torque during steering occurs while there is significant motor speed. The actual power that is regenerated is a function of the inner track torque times the inner track speed and can be up to four times as great as the maximum power generated by the motors at full speed during non-steering maneuvers. This extreme power demand is great enough in prior art transmission systems to force a large increase in the size of the motor and all the power handling equipment involved in the regeneration of this power. The present invention reduces this power demand and may be further described with reference to FIG. 1.

The dual-drive transmission 10 of FIG. 1 provides two paths for power to be regenerated during steering maneuvers. The primary path is the high efficiency mechanical path formed by the cooperative action of the planetary combining differential gear assemblies 16 and 18 and the transfer differential gear assembly 20. More particularly, this mechanical path allows a substantial portion of regeneration steer power to be transferred from the slower inner track 24 to the faster outer track 26. The second path of such regeneration steer power transfer is an electrical path primarily provided by the power transfer network 22 cooperatively operating with the networks 12 and 14.

As a speed control system, the motors 12 and 14 are driven at a speed to turn the vehicle according to the desired rate. Ground conditions determine the torque on the outputs 58A and 58B. If one torque is negative, it is regenerated to the other side. All of the regeneration is through the mechanical path up to the "Regeneration Transition Point." At that point, torque on the motor output goes from positive through zero and into negative. In order to resist this negative torque, that motor becomes a generator and delivers current to the other motor through the power transfer network 20. This is electrical regenerative power. It is always zero, or a small part of the total regenerated power. Whether the transmission 10 is operating within the regeneration range is determined by equation (1).

The overall effect of regeneration is to transfer some of the torque (negative) being applied to the inner track to the outer track. This effect reduces, and even eliminates, the disadvantageous negative, wasted torque that is typically transferred to the ground.

The percentages of power transferred by the sun gears and the ring gears are defined by the equations (9) and (10). All of the torque transferred by the ring gear is transferred mechanically. All of the torque transferred by the sun gears is also transferred mechanically until the regeneration transition point is reached. This is one of the primary advantages of the present system. The mount of power regenerated electrically is minimized. It is not a fixed percentage of the total power for all conditions, but may range from about zero percent (0%) up to a defined condition and is likely significantly less than twenty-five percent (25%) for the remaining conditions. The percentages of the power transferred by the mechanical path and the electrical path are respectively given in expressions (9) and (10) below:

$$\% \text{ Ring Gear Path} = \left(\frac{R}{R+S}\right) 100 \quad (9)$$

$$\% \text{ Sun Gear Path} = \left(\frac{S}{R+S}\right) 100 \quad (10)$$

From expressions (9) and (10), and from the previously stated number of internal teeth on the ring gears 56A and 56B (having three times the number of teeth as the sun gears 52A and 52B), it can be shown that 75% of the regenerative power is transferred by the ring gear path, whereas only 25% is transferred by the sun gear path. The components in the mechanical path are sized to carry the maximum torque, regardless of rotational speed. Therefore, the fact that the high torque occurs at high speed, transferring high torque or power, by way of the mechanical path is of no serious consequence. In addition, the overall efficiency of the electrical path is typically about 80% and the corresponding efficiency of the mechanical path is about 95%. The overall regeneration efficiency with a system embodying the concepts of the present invention is always equal to, or slightly less than, 95% inasmuch as the majority of the power is transferred via the mechanical path. This efficiency is a significant improvement over an 80% overall efficiency of a fully electrically regenerated feedback systems of the prior art electrical transmissions systems.

It should now be appreciated that the practice of the present invention provides for a dual-drive transmission having two separate drive sources that provides two separate outputs, each of which can be controlled independently of each other, and yet the dual-drive transmission 10 provides for a mechanical path to transfer power from one output to the other. The overall effect of such a mechanical path is the motor rating of each of the networks may be reduced by approximately 40% while still providing the power to accomplish all types of vehicle maneuvers including steering.

It should now be appreciated, that the present invention not only teaches the use of a dual-drive transmission for military vehicles, but also teaches the benefits of such a dual-drive transmission that may find application in other types of electrically operated vehicles.

While only a preferred embodiment of the present invention is disclosed, it is to be clearly understood that the same is susceptible to numerous changes apparent to .one skilled in the art. Therefore, the scope of the present invention is not to be limited to the details shown and described but is intended to include all changes and modifications which come within the scope of the appended claims.

The embodiments of the invention in which an exclusive property or privilege is claimed are defined as follows:

1. A dual-drive electric transmission comprising:
   a generator;
   means to operate said generator;
   left and right motor networks powered by said generator;
   speed control means independently to operate each said left and right motor networks at selected speeds;
   left and right combining differential means associated with said respective motor networks;
   each said combining differential means having a sun gear, a ring gear and a plurality of planetary gears meshing with said sun and ring gears;
   an output carrier supporting said planetary gears;
   means for operatively driving said sun gear in said left and right combining differential means with said left and right motor networks, respectively;
   means to conjoin said ring gears for unitary rotation in order to provide a mechanical regenerative path between said combining differential means; and,
   transfer differential means interacting between said sun gear in said left and right combining differential means to serve as a mechanical regenerative path until one of said left and right motor networks reverse rotates under the load applied to said output carrier.

2. A dual-drive electric transmission, as set forth in claim 1, further comprising:
   a power transfer network to connect said generator to each said left and right motor networks and to connect said left and right motor networks to each other to serve as an electrical regenerative path between said left and right motor networks.

3. A dual-drive electric transmission, as set forth in claim 2, wherein said transfer differential comprises:
   a pinion mounted to rotate in unison with said ring gears in said left and right combining differential means;
   left and right drive gears;
   said left drive gear operatively connected to rotate with said sun gear in said left combining differential means; and,
   said right drive gear operatively connected to rotate with said sun gear in said right combining differential means.

4. A dual drive transmission, as set forth in claim 3, wherein:
   said sun gears each have an equal number of teeth;
   said ring gears have internal teeth;
   the ratio of the number of internal teeth on said ring gears relative to the number of teeth on the corresponding sun gears is selected such that when the ratio of the torque supplied by the output carriers is equal to:

$$-\left(1 + \frac{2S}{R}\right)$$

electrical regeneration begins in said electrical regeneration path.

5. A dual drive transmission, as set forth in claim 4, wherein:
   each of said first and second motor networks have a torque rating which is about 62.5% of said full rated torque developed by said dual-drive transmission.

6. A dual drive transmission, as set forth in claim 5, wherein:
   said ring gear in each said combining differential means have approximately three times the number of internal teeth as the number of teeth on the sun gears in said same combining differential means.

7. A dual drive transmission comprising:
   left and right drive tracks;
   left and right motor networks;
   left and right combining differentials;
   said left and right combining differentials each having a sun gear, a ring gear operatively associated with one or more planetary gear sets that meshingly engage said sun gem: and said ring gear;
   drive means connecting said left and right motor means networks with the sun gear in said respective left and right combining differentials;
   a carrier connected to said planetary gears in each said combining differential;
   said carrier on said left and right combining differential connected to said respective left and right drive tracks;
   said ring gear in said left combining differential conjoined to said ring gear in said right combining differential; and,
   said sun gear in said left combining differential connected to said sun gear in said right combining differential through a transfer differential.

8. A dual drive transmission, as set forth in claim 7, wherein:
   said transfer differential has a pinion gear mounted to rotate with said ring gear in said left and right combining differentials;
   left and right drive gears in said transfer differential;

said left drive gear operatively connected to rotate with said sun gear in said left combining differential; and, said right drive gear operatively connected to rotate with said sun gear in said right combining differential.

9. A dual drive transmission, as set forth in claim 7, further comprising:
a generator;
a power transfer network to deliver electric current from said generator to said left and right motor networks and to provide an electric regeneration path connected between said left and right motor networks.

10. A dual drive transmission, as set forth in claim 9, further comprising:
control means independently to select the speed of said left and right motor networks.

11. A dual drive transmission, as set forth in claim 10, wherein:
each of said first and second motor networks have a torque rating which is about 62.5% of said full rated torque developed by said dual-drive transmission.

12. A dual drive transmission, as set forth in claim 11, wherein:
said sun gears each have an equal number of teeth.

13. A dual drive transmission, as set forth in claim 12, wherein:
said ring gears have internal teeth;
the ratio of the number of internal teeth "R" on said ring gears relative to the number of teeth "S" on the corresponding sun gears is selected such that the ratio of the torque supplied by the output carriers is equal to:

$$-\left(1 + \frac{2S}{R}\right)$$

electrical regeneration begins in said electrical regeneration path.

14. A dual drive transmission, as set forth in claim 12, wherein:
said ring gears have three times the number of internal teeth as those of the corresponding sun gears.

15. A dual drive transmission, as set forth in claim 12, wherein:
shaft means are provided to conjoin said ring gears to rotate in unison such that torque transferred between said combining differentials through said ring gears is transferred mechanically by said shaft means.

16. A dual-drive, electric transmission comprising:
a speed control network;
first and second motor networks each having a rotor delivering an adjustably selected speed in response to an electric control signal applied through said speed control network;
each of said first and second motor networks having means for developing a sensing signal indicative of the level of the selected speed;
said sensing signal fed back to said speed control network;
first and second planetary combining differential gear assemblies respectively cooperating with the said first and second motor networks and each having a respective sun gear, planetary gear means and a ring gear as well as a carrier supporting said planetary gear means and serving as the output stage of each planetary gear assembly, each of said sun gears operatively connected to said rotor and meshingly engaged with a planetary gear which, in turn, is meshingly engaged with a ring gear, each of said ring gears being secured to each other;
a transfer differential gear assembly having first and second drive gears and a pinion mounted on an output carrier meshingly to engage said pinion;
said first and second drive gears, respectively, connected to the sun gear of said first and second planetary combining differential gear assemblies; and,
said transfer differential output carrier connected to said ring gear in each said first and second planetary combining differential gear assemblies.

* * * * *